United States Patent [19]

Boyles et al.

[11] Patent Number: 4,826,195
[45] Date of Patent: May 2, 1989

[54] AUXILIARY TOWING APPARATUS FOR TRACTOR TRUCKS AND THE LIKE

[75] Inventors: William C. Boyles, Osteen, Fla.; Douglas R. Hagge, Columbus; C. V. Johnston, Hebron, both of Ohio

[73] Assignee: Cardinal Industries, Inc., Columbus, Ohio

[21] Appl. No.: 174,275

[22] Filed: Mar. 28, 1988

[51] Int. Cl.⁴ .............................................. B60P 3/06
[52] U.S. Cl. ................................ 280/402; 280/416.1; 414/563
[58] Field of Search ............... 280/402, 490 R, 415 A, 280/415 B, 408, 410, 461 A, 479 R; 414/563

[56] References Cited

U.S. PATENT DOCUMENTS

| | | | |
|---|---|---|---|
| 3,333,718 | 8/1967 | Durham | 214/778 |
| 3,413,015 | 11/1968 | Fontaine | 280/415 |
| 3,599,812 | 8/1971 | Hasstedt et al. | 280/415 X |
| 3,697,098 | 10/1972 | Fisher | 280/415 R |
| 3,715,042 | 2/1973 | Rellinger | 280/415 A X |
| 3,716,253 | 2/1973 | Gniffke | 280/415 A |
| 3,957,167 | 5/1976 | Jacobson et al. | 280/415 A X |
| 4,340,240 | 7/1982 | Anderson | 280/461 A |
| 4,611,968 | 9/1986 | Casteel | 414/563 |
| 4,640,528 | 2/1987 | Boyles et al. | 280/423 R X |

Primary Examiner—Charles A. Marmor
Assistant Examiner—Michael Mar
Attorney, Agent, or Firm—Porter, Wright, Morris & Arthur

[57] ABSTRACT

A transverse beam is disposed between and pivotally connected to the rear ends of a pair of load-receiving frame members on a tractor truck. An elongated housing is secured to and depends from the transverse beam. A sleeve is slidably mounted on the housing. A hydraulically actuated ram is mounted in the housing and is operatively connected to the sleeve. A pair of relatively spaced apart elevator arms are pivotally connected at one of their ends to the truck frame members and at intermediate positions to opposite sides of the sleeve, and a hitch mechanism is secured to the ends of the elevator arms outwardly of the sleeve. The hitch mechanism includes a central rotatable portion provided with a ring-shaped hitch and a separable latch projecting outwardly in opposite directions.

5 Claims, 2 Drawing Sheets

AUXILIARY TOWING APPARATUS FOR TRACTOR TRUCKS AND THE LIKE

BACKGROUND OF THE INVENTION

The present invention relates to an auxiliary towing device attached to a tractor truck for towing another tractor truck, and more particularly to such devices equipped with hydraulic lifting components.

It is not uncommon for one hundred or more manufactured building modules to be employed in a single apartment, motel, office, or residential complex. Typically, such modules are transported from the factory to the construction site on relatively low slung highway semitrailers, such as those disclosed in U.S. Pat. No. 4,640,528. At a maximum, such highway semitrailers can accomodate two prefabricated building modules, so quite a few semitrailers and tractor trucks are needed to transport all of the modules to the site.

Advantageously, the low slung highway semitrailers, once emptied, may be stacked upon one another in groups of three and returned to the factory by a single tractor truck. Since the two remaining trucks have nothing to transport, a mechanism was sought whereby one of the tractor trucks could haul the other. In this manner, one out of every three drivers who carried building modules from the factory to the site could rest and relieve the other drivers on the return trip. In addition, fuel consumption and operating hours on the truck fleet could be reduced, since the engine on the truck being towed would not be running.

In the past, tractor trucks have been transported along the highways either in piggyback fashion by elevating the front end of one truck and attaching it by suitable connectors to the fifth wheel device of another, or in tandem fashion by elevating and connecting a front or rear end of one truck to the rear end of another. Towing a truck in piggyback fashion requires a substantial amount of conformity in the design of the towing and towed trucks, as well as an external lifting device to elevate the front end of the towed truck. Further, the rear axle or axles of the truck being towed in piggyback or tandem fashion must be removed to prevent damage to the differential and/or transmission.

Thus, an early attempt was made to devise a mechanism for lifting the rear end of a truck and towing it in back to back relation to the truck doing the towing. The early towing assembly included a support structure rigidly secured to and depending from rear portions of both the towing and towed trucks. Hydraulically actuated lifts were mounted on the support structures. A U-shaped tow bar was stowed on each truck, and sockets were provided in the support structure into which the free ends of the tow bar were inserted on the truck to be towed. Some of the problems with this system were the tendency for the tow bar to be forgotten or misplaced or for it to be difficult to manipulate due to its substantial weight and size. Another problem was the tendency for the lift to be damaged due to the very limited clearance between an upper portion of the hydraulic lift and front portions of the semitrailers during attachment and detachment with the tractor truck. The previous design also required special parts and a substantial amount of alteration to the existing truck frame.

Accordingly, the inventors were faced with the problem of devising a truck towing apparatus which could be used on both the truck doing the towing and the truck being towed without requiring the operator to stow and manipulate large, heavy frame members. In addition, the inventors sought to devise a towing apparatus that would lift the truck being towed higher and yet have a sufficiently low profile to avoid being struck when a semitrailer was being connected or disconnected with the tractor truck. Further, the inventors were confronted with the problem of designing a towing apparatus that did not require substantial alteration of the tractor truck to which it would be attached, as well as one that did not require expensive, special-order parts.

DISCLOSURE OF THE INVENTION

The present invention is a vehicle towing apparatus adapted for attachment to rearwardly disposed portions of a pair of relatively spaced apart load-receiving members on a tractor truck or the like. The towing apparatus basically comprises a transverse beam pivotally mounted at opposite ends thereof on the load-receiving members of the truck; a housing depending from the transverse beam; a sleeve slidably mounted on the housing; a hydraulically actuated ram mounted in the housing and operatively connected to the sleeve; a pair of relatively spaced apart elongated elevator arms, each of said arms being pivotally connected to one of the load-receiving members of the truck and to the sleeve; and coupling means secured to the elevator arms outwardly of the sleeve.

The present invention also comprises an improvement in a vehicle towing apparatus depending from a rearwardly disposed load-receiving portion of a tractor truck or the like. The improvement comprises a coupling mechanism having a central portion rotatively mounted between end portions and provided with a male member and a female member projecting in opposite directions therefrom; means for elevating and lowering the coupling mechanism operatively connected to the end portions and means for releasably securing the central portion in a position whereby one of the male and female members projects rearwardly therefrom.

One of the primarily objects of the present invention is to provide a vehicle towing apparatus which is readily mounted on a rearwardly disposed portion of both the towing vehicle and the vehicle being towed. Another object of the present towing apparatus is to eliminate the need for additional frame or support members to be carried on either the towed or towing vehicles. Further objects of the present invention are to provide a towing apparatus which is relatively easy to maintain and that is sufficiently compact to avoid being damaged by a semitrailer attached to the tractor truck when the towing apparatus is not in use. Further objects and advantages of the present invention may be more readily perceived and understood in view of the following drawings and detailed description of the preferred embodiment.

BEST MODE OF CARRYING OUT THE INVENTION

Figure 1:
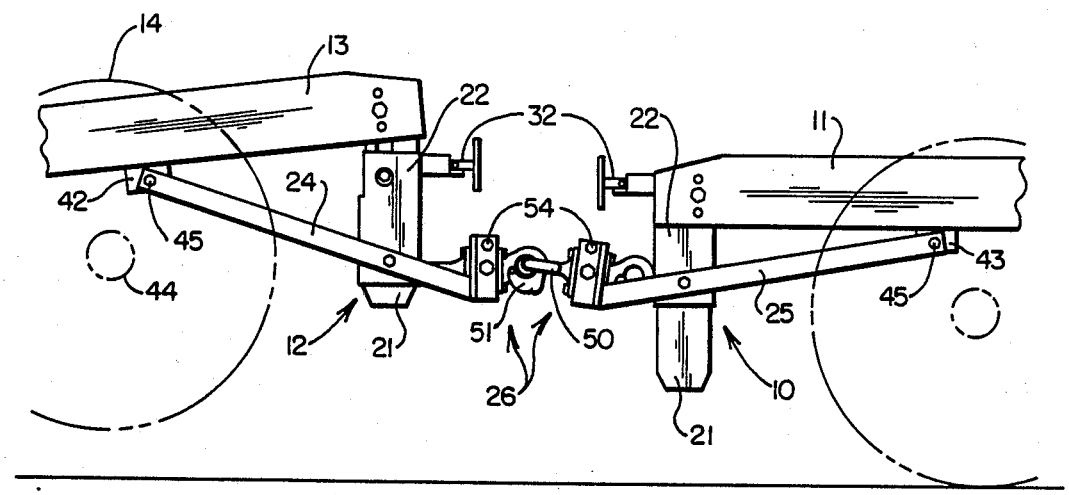
FIG. 1 is a fragmentary side elevational view of rearwardly disposed portions of two tractor trucks, one disposed in a position to be towed by the other, and each provided with a vehicle towing apparatus according to the present invention.

As indicated in FIG. 1, one vehicle towing apparatus according to the present invention, generally designated 10, is attached to a rearwardly disposed portion of a tractor truck 11 doing the towing and a second towing apparatus, generally designated 12, is attached to a rearwardly disposed portion of a truck 13 being towed. The trucks are connected together at their tail ends by their respective towing devices. The towing apparatus on the towed truck 13 is locked into a relatively lowered position, and its rear drive wheels 14 are lifted off of the ground by raising operative portions of the towing apparatus 10 on the towing truck 11. Since the towing apparatus on both vehicles are substantially identical, the preferred construction of only one of them will be described in detail.

Figure 2:
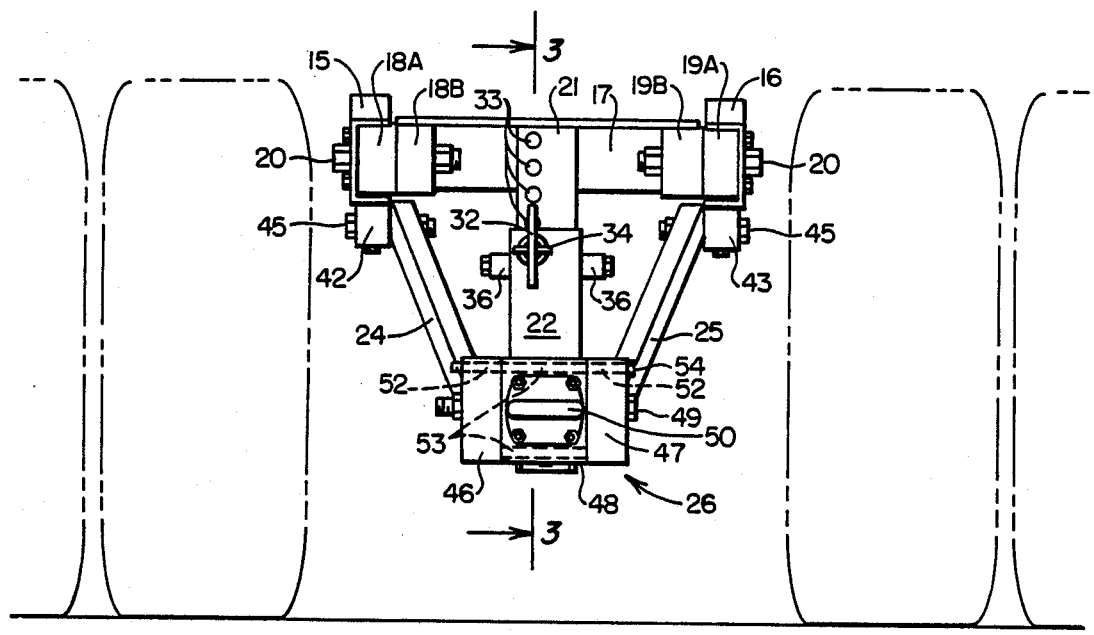
FIG. 2 is an enlarged rear end elevational view of the present towing apparatus in a lowered position, together with fragmentary portions of a truck to which it is attached.

As indicated in FIG. 2, the present towing apparatus is attached to rearwardly disposed portions of a pair of relatively spaced apart, load-receiving members 15 and 16 on the tractor truck. Preferably, the load-receiving members are the main longitudinally extending frame members to which the axles, fifth wheels, body and engine of the tractor truck are operatively connected. The present towing device basically comprises a load-supporting transverse beam 17; relatively opposing pairs of mounting blocks 18 and 19 and related fasteners 20 for pivotally mounting opposite ends of the beam on the load-receiving members; a relatively elongated housing 21 depending from the transverse beam 17; a sleeve 22 slidably mounted on the housing; a hydraulically actuated ram 23 (FIGS. 3 and 4) mounted on the housing and operatively connected to the sleeve; a pair of relatively spaced apart, elongated elevator arms 24 and 25, each pivotally connected to one of the load-receiving members 15 and 16, respectively, and to relatively opposing portions of the sleeve 22; and a coupling or hitching device, generally designated 26, connected to the elevator arms 24 and 25 rearwardly of the sleeve 22.

Figure 3:
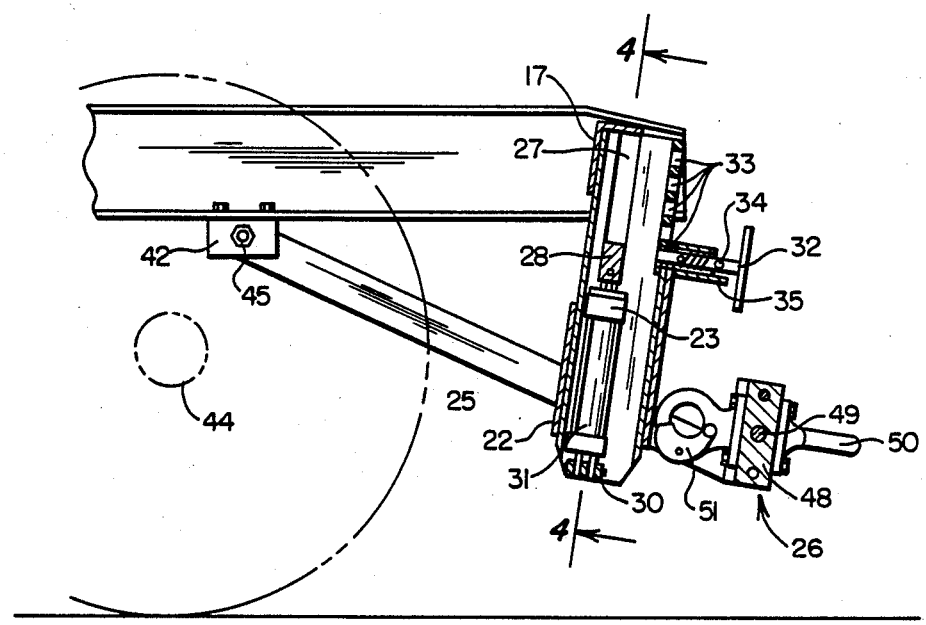
FIG. 3 is a vertical sectional view taken along line 3—3 of FIG. 2 and particularly illustrates the preferred construction of the housing, sleeve and coupling mechanism of the present towing apparatus.
Figure 4:
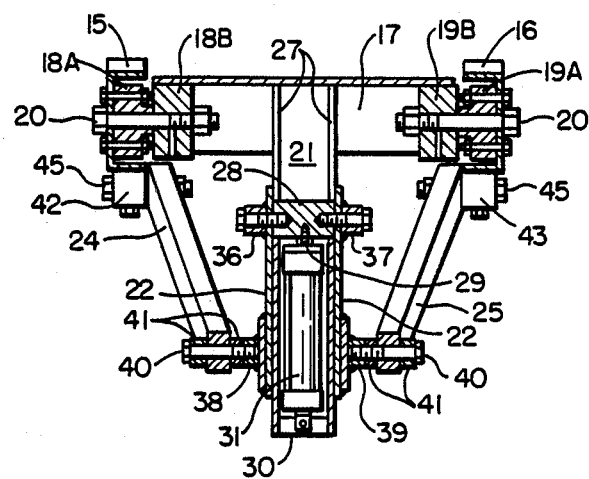
FIG. 4 is a generally vertical sectional view taken along line 4—4 of FIG. 3 and particularly illustrates some of the pivotal connections between portions of the tractor truck and towing apparatus, as well as connections within said apparatus.

As indicated in FIGS. 3 and 4, the transverse beam 17 is preferably an L-shaped length of steel to which pivot blocks 18B and 19B are welded so that the outer faces of the pivot blocks are generally flush with the end edges of the beam. Each pivot block is provided with a pin-receiving bore and a duct through which lubricant can be injected into the bore.

Since the distance between the load-receiving frame members 15 and 16 varies between different makes of trucks, the transverse beam 17 is sufficiently short to fit between the frame members of substantially all of the standard makes and models. Typically, the load-receiving frame members 15 and 16 are generally U-shaped in cross-section. Accordingly, the mounting blocks or spacers 18A and 19A are shaped and sized to be seated within the channel defined by the U-shaped frame members. Each mounting block is provided with a central pin-receiving bore and with a pair of diametrically opposing, fastener receiving bores by which the mounting blocks are secured to the web portions of the frame members. In this manner, the pivot blocks and mounting blocks 18A and 18B and 19A and 19B, respectively, are disposed in close proximity to one another and support pivot pins 20, thereby permitting the transverse beam 17 to be pivotally mounted on the frame members 15 and 16. Advantageously, the thickness of the mounting blocks 18A and 19A may be increased to provide additional support for the pivot pin when the distance between the frame members of a particular truck is larger than average. In any event, since the transverse beam is somewhat shorter than the distance between the truck frame members and is mounted thereon by means of pivot pins 20, the transverse beam is capable of limited pivotal or rotative movement relative to the truck frame members.

As indicated collectively in the drawings, the housing 21 is an elongated, hollow structure generally rectangular in cross-sectional configuration. It is welded or otherwise rigidly secured along an upper side and edge portion to a central portion of the transverse beam 17. An upper portion of each of the side walls of the housing is formed with a downwardly extending slot 27 (FIGS. 3 and 4) which serves as a guide for opposing ends of a slide block 28 to which a piston 29 of the hydraulic ram 23 is connected. A base portion 30 of the housing 21 is preferably provided with access openings for inserting and removing a fastener that holds a pair of digits projecting from a lower end of the ram cylinder 31 between relatively spaced apart knuckles projecting from the base. Advantageously, the base portion 31 is removable so that the hydraulically actuated ram may be lowered from the housing 21 for servicing. As indicated in FIGS. 2 and 3, an upper portion of the rearwardly projecting face of the housing is formed with a plurality of relatively spaced apart, vertically aligned sockets 33 whose functions are described below.

The sleeve 22 is disposed in generally surrounding relation to and is slidably mounted on the housing 21. Said sleeve is equipped with a spring-loaded locking mechanism projecting rearwardly from an upper rear portion thereof. The locking mechanism includes a bolt 32 provided with a handle at one end and a shaft portion at the other which is insertable into one of the sockets 33 formed in the housing 21. A diametrically opposing pair of catches 34 project radially outwardly from the bolt 32, and a stop 35 (FIG. 3) projects rearwardly from a collar surrounding the bolt.

As best indicated in FIG. 4, the sleeve is formed with a pair of upper collars 36 and 37 projecting laterally outwardly from upper portions of opposing side walls thereof. Each collar 36 and 37 is formed with a bore through which a threaded connector extends to secure the sleeve to the block 28 slidably mounted in the housing channels 27. In this manner, the ram piston 29 is operatively connected to the sleeve 22.

As further indicated in FIG. 4, the sleeve is also provided with a pair of lower collars 38 and 39 projecting laterally outwardly from relatively opposing sides thereof. Each collar is formed with a threaded socket which receives a pivot pin 40. Each pivot pin extends through one of the elevator arms 24 and 25 and through a pair of spacers 41 disposed on opposite sides of each arm. Preferably, the spacers 41 are welded to the elevator arms, and a bushing, (not shown) is disposed between the pivot pin 40 and the bores of the spacers and elevator arms.

As indicated collectively in the drawings, each of the elevator arms 24 and 25 is an elongated steel bar generally rectangular in cross-sectional configuration. Each arm extends from the load-receiving frame members of the tractor truck to the coupling mechanism 26. Forwardly projecting ends of the elevator arm 24 and 25 are pivotally attached to load blocks 42 and 43, respectively. Each load block is secured to the undersurface of one of the frame members 14 and 15 forwardly of the transverse beam 17, preferably in an area slightly rearward of the rear drive axle 44 (FIG. 3). In a manner similar to other pivotal connections on the present towing apparatus, a pivot pin 45 extends through each load block 42 and 43 and each elevator arm 24 and 25, and is secured thereto by a nut or other fastener. Preferably, a lubricating duct is provided in each elevator arm and communicates with the pin-receiving bore formed therein.

The elevator arms extend rearwardly beyond their pivotal connections on the low sleeve collars 38 and 39 and are rigidly connected to the coupling device 26. The hitch 26 preferably comprises a pair of end members 46 and 47 and a central member 48 rotatively mounted between the end blocks on a pivot pin 49. The rearwardly disposed ends of the elevator arms 24 and 25 are welded or otherwise rigidly secured to the end blocks 46 and 47, respectively. The central rotatable block 48 is provided on one side with a unitary, ring-shaped female member or yoke 50 and on the other side with a separable male member or latch 51. As indicated in FIG. 2, each of the end blocks 46 and 47 is provided with a pilot bore 52 disposed above the central rotator pin 49. The central block 48, in turn, is provided with a pair of opposing pilot bores 53, each alternately aligned with the pilot bores in the end members, depending upon whether the yoke 50 or latch 51 is extending rearwardly from the central block. Once the pilot bores 52 and 53 are aligned, a locking pin 54 is extended therethrough, to prevent the central block from rotating.

In operation and as best indicated in FIG. 1, the yoke 50 is placed in a rearwardly extending position on the towing truck 11 and is locked in place by the locking pin 54. The latch 51 is placed in a rearwardly extending position on the towed truck 13 and is likewise locked in place. Next, the sleeve locking bolt 32 on the towed vehicle is retracted, and the sleeve 22 is lowered by means of controls (not shown) for the hydraulically actuated ram disposed within the housing 21. Once the sleeve is at its lowest position on the housing, the handle on the locking bolt 32 is turned so that the operative end can project into the lowermost of the sockets 33 (FIG. 3) in the housing 21. In this manner, mechanical means are provided to prevent the sleeve from moving relative to the housing, in addition to the resistance to movement provided by the hydraulically actuated ram.

Likewise, the sleeve stop mechanism 32 on the towing truck 11 is moved to a retracted position, and the sleeve is dropped to its lowest position. The center block of the hitch assembly on the truck being towed is rotated so that the latch 51 is projecting rearwardly and is locked in place. The towing truck is then backed into a position where the ring hitch 50 of the towing truck and the latch 51 of the towed truck are interconnected. Chains (not shown) are then wrapped around the rear axle 44 of the towed truck to prevent the wheels and axle from dropping as the rear end of the towed truck is raised. The hydraulic lift mechanism on the towing truck is actuated, thereby elevating the rear end of the truck being towed. Suitable electrical connections (not shown) are made between the two trucks so that the front turn signal lights on the truck being towed are properly activated by the brake and turn signal switches on the truck doing the towing. In this manner, traffic traveling behind the truck being towed is adequately warned prior to deceleration and turning. Preferably, the front turn signal lights on the truck being towed are masked with transparent or translucent red material. Once the towed truck is elevated, the sleeve stop 32 on the towing truck is inserted into one of the uppermost sockets on the housing. In addition, safety chains (not shown) are attached to and interconnect the frame members of the two trucks. Finally, the steering wheel of the towed truck is lashed in place to hold the front wheels steady while the truck is being towed.

In this manner, a truck towing apparatus is provided that, when installed on each truck in a fleet, permits any of the tractor trucks to tow another without requiring additional frame or support members, or expensive hard-to-find parts or special precautions to prevent damage to the mechanism during coupling and uncoupling of semitrailers.

While a single preferred embodiment of the present invention has been set forth in some detail, the foregoing drawings and description are not intended to restrict unduly the spirit or gist of the invention or to limit the scope of the following claims.

We claim:

1. Vehicle towing apparatus adapted for attachment to rearwardly disposed portions of a pair of relatively spaced apart, load-receiving members on a tractor truck or the like, said towing apparatus comprising:
    (a) a transverse beam pivotally mounted at opposite ends thereof on the rearwardly disposed portions of the load-receiving members;
    (b) a housing depending from the transverse beam;
    (c) a sleeve slidably mounted on the housing;
    (d) a hydraulically actuated ram mounted in the housing and operatively connected to the sleeve;
    (e) a pair of relatively spaced apart elongated elevator arms each pivotally connected to one of the load-receiving members of the truck and to relatively opposing portions of the sleeve; and
    (f) coupling means connected to the elevator arms outwardly of the sleeve for attachment to a vehicle to be towed.

2. Vehicle towing apparatus according to claim 1, wherein a stop member is mounted on the sleeve for selective engagement with a plurality of openings on the housing.

3. Vehicle towing apparatus according to claim 1, wherein the transverse beam is pivotally mounted on rear end portions of the load-receiving members of the truck and wherein each of the elevator arms is pivotally mounted on the load-receiving members in inwardly spaced relation to the transverse beam.

4. In a vehicle towing apparatus according to claim 1, wherein the coupling means comprises a central block rotatively mounted between end blocks and provided with a male coupling member and a female coupling member projecting in opposite directions therefrom.

5. Vehicle towing apparatus, according to claim 4, wherein first and second tractor trucks or the like are each provided with said apparatus and wherein the coupling members thereon are adapted to connect said trucks together.

* * * * *